United States Patent [19]
Pirok

[11] Patent Number: 5,386,800
[45] Date of Patent: Feb. 7, 1995

[54] MANGER FOR ROUND HAY BALES

[76] Inventor: Henry T. Pirok, 11405 Lake Rd., Highland, Ill. 62249

[21] Appl. No.: 262,010

[22] Filed: Jun. 17, 1994

[51] Int. Cl.⁶ .............................................. A01K 1/10
[52] U.S. Cl. ...................................... 119/58; 119/60
[58] Field of Search ...................... 119/58, 59, 60, 10; 211/125

[56] References Cited

U.S. PATENT DOCUMENTS

| | | | |
|---|---|---|---|
| 310,261 | 1/1885 | Downing | 119/58 |
| 375,824 | 1/1888 | Light | 119/60 |
| 387,891 | 8/1888 | Light | 119/60 |
| 3,999,520 | 12/1976 | Feterl | 119/58 |
| 4,258,663 | 3/1981 | Schoessow | 119/60 |
| 4,706,609 | 11/1987 | Delichte | 119/60 |
| 5,158,040 | 10/1992 | Martin | 119/58 |
| 5,178,096 | 1/1993 | Lock | 119/60 |

FOREIGN PATENT DOCUMENTS 1582151 12/1980 United Kingdom .................. 119/60

*Primary Examiner*—Todd E. Manahan
*Attorney, Agent, or Firm*—Don W. Weber

[57] ABSTRACT

A hay manger for large round bales of hay has a square box at the bottom which keeps any hay that falls from the bale dry. At each corner of the box is a vertical post. The posts are connected by horizontal cross braces. Slanted bars are located at appropriate intervals to both support the hay and to keep the cattle from actually entering the box. The bars are attached to the upper horizontal cross-bars and slant towards the center of the lower box. Attached to the horizontal cross braces approximately five feet from the top edge of the lower box are L-shaped hooks which support the bulk of the weight of the large round bales. The cattle eat the hay from the bottom. Since the bale is supported by the L-shaped hooks, loose hay is easily provided for the cattle feeding. Additionally, the inward slant of the bars creates a large amount of comfortable shoulder room for the animals and keeps the majority of the hay from the ground since nearly all falling hay drops into the box.

4 Claims, 4 Drawing Sheets

MANGER FOR ROUND HAY BALES

BACKGROUND OF THE INVENTION

This invention relates to the field of animal husbandry. More particularly, it relates to the field involving the dispensing of hay for livestock.

In the animal husbandry field, it is common to feed hay to cows and other livestock by use of a manger or livestock feeder. The normal bale of hay weighs ¾ of a ton to a ton. Although hay bales were formerly formed in smaller units, today it is common practice to roll the hay into large essentially cylindrical bales. These bales are then fed to cattle in order to increase the production of the cattle. The average animal will eat approximately 3% of its own weight per day, which translates to eighteen pounds of fodder a day for a six-hundred pound cow.

One problem currently encountered in the use of large round bales of hay is that the hay is rolled so tightly that the animal feeding on the hay has a difficult time securing enough loose hay to eat. Oftentimes the bales are rolled so tightly, or placed in conventional mangers in such a way, that the animal has to fight for each mouthful of hay that it is to consume. This creates the problem of the cattle spending less time eating and more time fighting the hay bale for loose hay.

It is an object of this invention to provide a unique new manger design for dispensing hay which allows the cattle to loosen the hay without struggling each time the cattle are to feed.

An average herd of animals (about 45 cattle) will consume approximately 2½ bales of hay per week using the current manger systems. The instant device will increase that consumption to approximately 3½ bales per week. It is another object of this invention to increase the ease of hay consumption and the amount of hay consumption for cattle.

Mangers now in use currently do not have an effective means of keeping inadvertently spilled hay dry. It is another object of this invention to provide a means for keeping loose hay from falling onto the ground. The provision for keeping the hay from the wet ground keeps the hay dry so that water is not allowed to soak into the hay. It is a still further object of this invention to keep hay waste to a minimum and to provide a container into which the hay will fall so as to preserve the edibility of such hay.

Other types of animal feeders for large round bales of hay have been known in the art. For example, the 1992 patent issued to Martin for an animal feeder describes an animal manger used in conjunction with round bales of hay. Yet another livestock feeder for cylindrical bales is found in the 1987 patent issued to Delichte. A portable livestock feeder patent was issued to Feterl in 1976. All of the above listed patents, while having certain salutary features, do not address the problems solved by the instant hay feeder. In particular, the weight of the bale of hay in all of the three previously cited devices compresses the hay so that loose hay is not available to the cattle. It is a still further object of this invention to provide a portable hay manger for large cylindrical bales of hay which provides loose hay at all times for consumption by cattle. Other and further objects of this invention will become apparent upon reading the below described Specification.

BRIEF DESCRIPTION OF THE DEVICE

This device consists of a semi-portable hay manger having slanted side rails which are secured around an upper essentially square frame. The side rails slant inwardly from top to bottom. Also provided with this device is an essentially square lower box which catches fallen hay before it reaches the ground. A further refinement on this device includes a plurality of L-shaped hay hooks which suspend the round bale of hay in the air. When animals are feeding with this particular manger, they eat the round bale of hay from the bottom up. While this procedure would be impossible with other mangers, the unique placement of the hooks requires that the cattle loosen the hay only once for each bale consumed. The hay is partially suspended by the hooks and partially slumps towards the bottom of the hay manger. The partial suspension of the hay bale provides a unique means for the supply of a continuous amount of loose hay for cattle. A hinged gate on one side of the manger allows for easy access to the interior of the manger and deposition of the round hay bale on the L-shaped hooks. The manger is semi-portable and may be moved from place to place as necessary.

DETAILED DESCRIPTION OF THE PREFERRED EMBODIMENT

A hay manger for large round hay bales is presented. The hay manger comprises essentially a lower hay containing box 2 and an upper pattern of slanted bars and braces.

Figure 1:
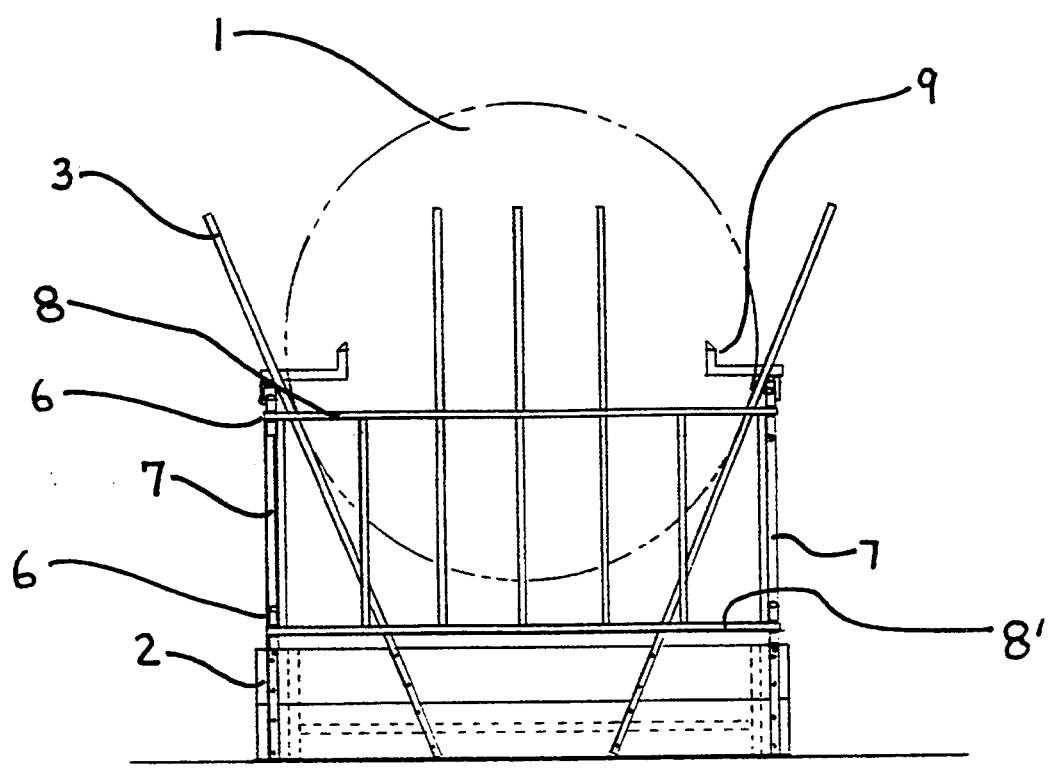
FIG. 1 is an end view of the hay manger taken towards the swinging gate showing the slanted sides and L-shaped hooks. The large round hay bale is shown in phantom lines.

As best shown in FIG. 1 a large round hay bale 1 is placed in the upper portion of the hay manger. The hay manger has at its bottom a lower containment box 2 with an essentially square cross-section.

Figure 2:
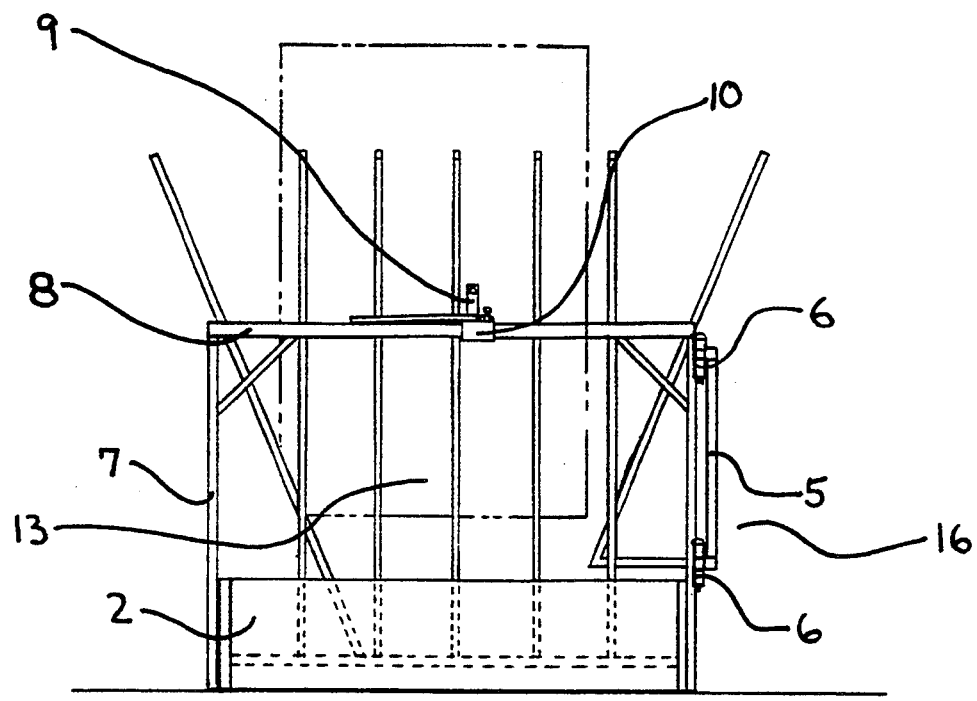
FIG. 2 is a side view of the hay manger shown in FIG. 1.

The frame of the hay manger comprises vertical corner posts 7 located at each corner of the box. These vertical corner posts 7 are connected by horizontal upper 8 and lower 8' cross braces. The posts and cross braces form rectangles joined at the corner post 7. This structure is best shown on FIGS. 1 and 2.

Figure 3:
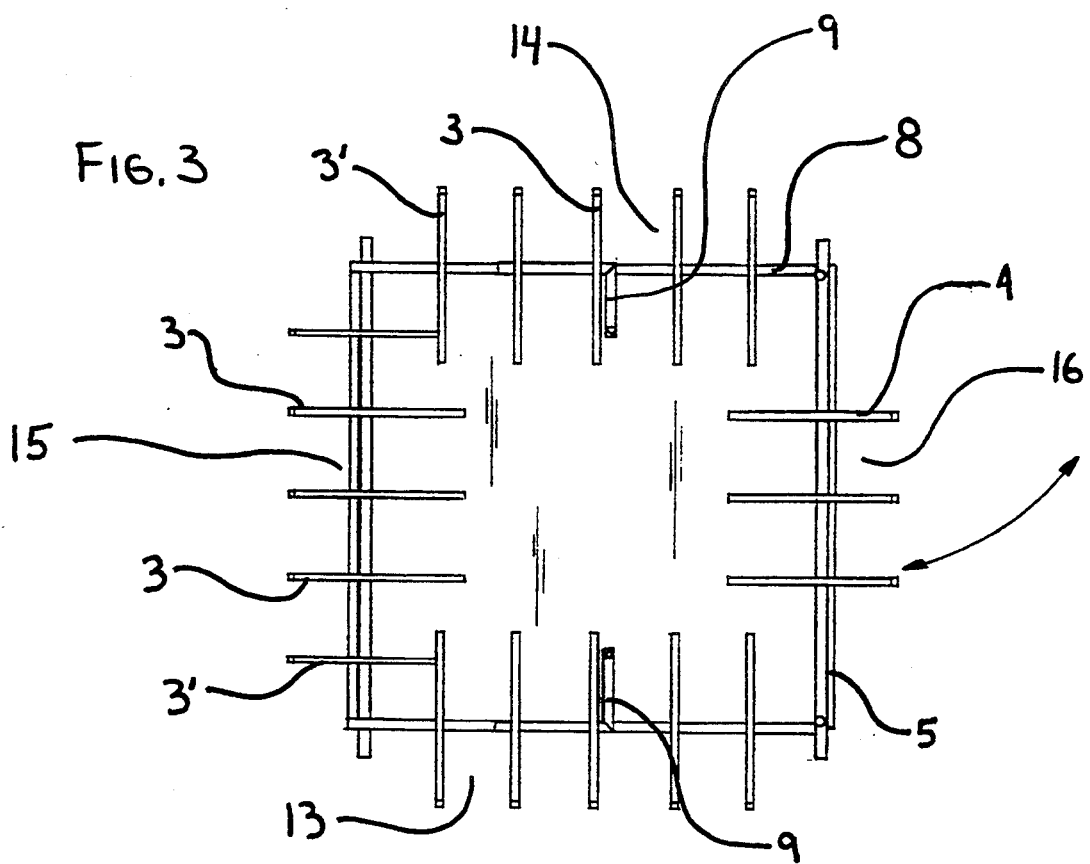
FIG. 3 is a top view of the hay manger shown in FIGS. 1 and 2.

Attached to each essentially rectangular side and end is a plurality of slanted bars 3. As best shown on FIG. 3, these slanted bars 3 are connected to the upper horizontal cross braces 8. The manger comprises left 13, right sides 14 and ends 15 as shown on FIG. 3. The remaining gate end 16 of the manger comprises the hinged gate 5. This hinged gate 5, shown on FIG. 3, has only three slanted bars. The hinged gate 5 is hinged to vertical corner posts 7 and is arranged so that the hinged gate 5 may swing outwardly in the direction of the arrow shown on FIG. 3. The hinges 6 for the gate 5 are best shown on FIG. 1. The gate may also be made so that the gate swings from both the left and right sides.

The slanted bars 3 taper inwardly and downwardly and have their upper portions anchored to the upper horizontal cross braces 8. The slanted bars 3 are spaced approximately 12 inches apart so as to allow the head of livestock to fit therebetween.

The essentially rectangular configuration of the vertical corner posts 7 and horizontal cross braces 8 and 8' have slanted oblique bars 3 spaced along the length of the side. As can best be shown in FIG. 3, the corner slanted bars 3' (which are located near the corner of the box and frame) may be welded to each other in order to provide a more stable configuration of the device. Furthermore, the number of slanted bars 3 along any side or along the hinged gate 5 may vary depending upon the precise dimensions of the box and frame as well as the need for the appropriate amount of room for the animal's head.

Figure 4:
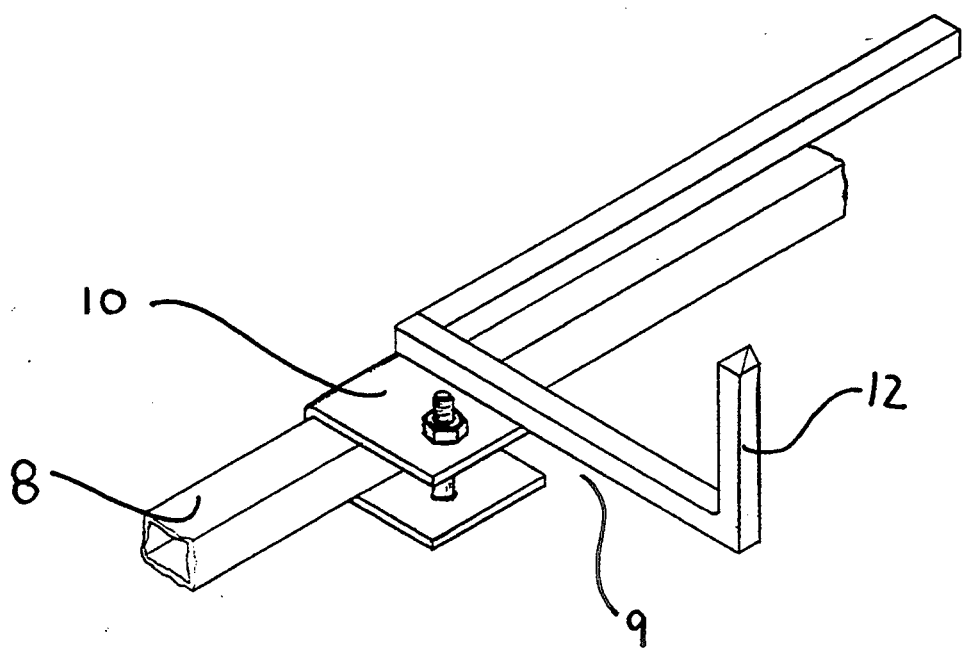
FIG. 4 is an exploded detailed view of the L-shaped hook.

A unique means of supporting the round hay bale 1 is best shown on FIGS. 1, 2, 3 and 5. Attached to opposite left 13 and right 14 horizontal cross braces 8 is an L-shaped hook 9. This L-shaped hook 9 may be attached to cross braces 8 by means of welding the L-shaped hook 9 to the brace 8 or by means of a movable bracket 10, shown on FIG. 4. The L-shaped hooks have an essentially inwardly extending horizontal portion attached to the horizontal cross brace 8 and an essentially upwardly extending vertical portion 12. This L-shaped hook and bracket are best shown on FIG. 4.

Figure 5:
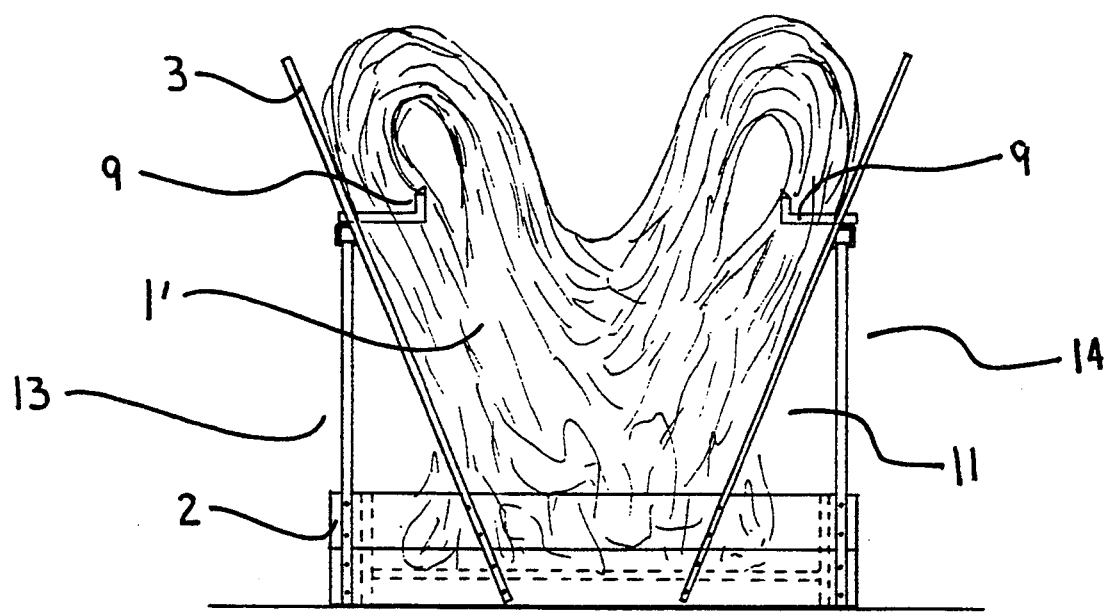
FIG. 5 is an end view of the hay manger shown in FIG. 1, depicting the slump of the large round hay bale about the L-shaped hooks.

Turning now to FIG. 5, it can be seen how the essentially large round bale (1 shown on FIG. 1) will slump by the force of gravity and by the force of cattle feeding from the bottom of the bale 1 into an essentially heart-shaped configuration 1'. As the cattle reach underneath the round bale to feed, they pull the hay loose from the round bale and the bale slumps towards the box 2. However, the L-shaped hooks 9 suspend the greater weight of the bale and the hay is thus loosened and available for easy feeding as shown in FIG. 5. As the cows feed, loose feed drops towards the lower portion of the bale and onto the floor of the box 2. The lower box 2 has an essentially square cross-section and comprises four vertical sides and a horizontal floor.

Since the slanted bars 3 taper inwardly and downwardly towards the center portion of the box 2, a large shoulder space 11 is created for the animals' head and shoulders. In other devices, for example the animal feeder shown in Martin, the vertical configuration of the bars make it harder for the cattle to reach hay that has fallen near the center of the lower box. The slanted bars described herein also keep the hay suspended from the L-shaped hooks from being pulled out too far as the cattle eat the hay. This, in turn, keeps nearly 100% of the hay which inadvertently falls in the water-proof box 2 below.

Although simple in configuration, the unique geometry of the slanted bars, as well as the lower box and the L-shaped hooks for suspension of the hay bale all create the optimum hay manger for the feeding of cattle. The lower box may be water-tight.

The lower box 2 and upper slanted bars 3 and frame are easily transported from one area of the field to another, as needed, by a tractor or truck. The manger is approximately 6 feet high and approximately eight feet square, as shown herein. The distance between adjacent slanted bars 3 may also vary. The upper horizontal brace 8 is approximately 5 feet from the ground. The foregoing dimensions are for purposes of description only and are not meant as a limitation. Other shapes, lengths, widths and heights may also be utilized while still keep within the spirit and concept of the present invention.

The lower box 2 may be constructed of wood, metal, fiberglass, or similar material.

It is also possible to add a bumper on the end 15 of the hay manger to keep the round bale from rotating although such bumper has been found to be unnecessary in most applications.

Having fully described my device, I claim:

1. A manger for large round bales of hay, comprising:
   (a) a lower box having an essentially square cross-section;
   (b) vertical posts located at each corner of said box and upper and lower horizontal cross braces connecting said vertical posts forming an essentially four-sided frame about said box;
   (c) a plurality of downwardly and inwardly slanted bars, the upper portion of which are attached to said upper horizontal cross braces, for supporting a round bale of hay;
   (d) at least two L-shaped hooks attached to opposite horizontal braces and extending inwardly and upwardly therefrom for supporting a round bale of hay.

2. A manger for large round bales of hay as in claim 1, wherein said lower box is water-tight.

3. A manger for large round bales of hay as in claim 1, wherein one side comprising upper and lower cross braces, and the slanted bars connected thereto, is hinged such that said side may swing outwardly whereby easy access to the inside of said manger is achieved.

4. A manger for large round bales as in claim 1, wherein the entire manger device is portable.

* * * * *